United States Patent
Galan et al.

(10) Patent No.: US 9,473,288 B2
(45) Date of Patent: Oct. 18, 2016

(54) SYSTEM FOR ENABLING DUPLEX COMMUNICATION ON PORTABLE RADIOS

(71) Applicant: MOTOROLA SOLUTIONS, INC, Schaumburg, IL (US)

(72) Inventors: Ariel L. Galan, Ft Lauderdale, FL (US); Francisco A. Azcuy, Miami, FL (US); Chris Ganio, Coral Springs, FL (US)

(73) Assignee: MOTOROLA SOLUTIONS, INC., Schaumburg, IL (US)

(*) Notice: Subject to any disclaimer, the term of this patent is extended or adjusted under 35 U.S.C. 154(b) by 80 days.

(21) Appl. No.: 14/091,012

(22) Filed: Nov. 26, 2013

(65) Prior Publication Data

US 2015/0146582 A1   May 28, 2015

(51) Int. Cl.
| | |
|---|---|
| H04L 5/14 | (2006.01) |
| H04L 5/16 | (2006.01) |
| H04B 1/48 | (2006.01) |
| H04B 1/44 | (2006.01) |
| H04W 88/06 | (2009.01) |
| H04B 1/00 | (2006.01) |

(52) U.S. Cl.
CPC .............. *H04L 5/1461* (2013.01); *H04B 1/44* (2013.01); *H04B 1/48* (2013.01); *H04L 5/16* (2013.01); *H04B 1/0064* (2013.01); *H04B 2001/485* (2013.01); *H04W 88/06* (2013.01)

(58) Field of Classification Search
CPC ...... H04L 5/1423; H04L 5/14; H04L 5/1461
See application file for complete search history.

(56) References Cited

U.S. PATENT DOCUMENTS

| | | | |
|---|---|---|---|
| 5,787,115 A * | 7/1998 | Turnbull et al. | 375/222 |
| 5,809,405 A | 9/1998 | Yamaura | |
| 7,567,527 B2 | 7/2009 | Perlman | |
| 2004/0166802 A1* | 8/2004 | McKay et al. | 455/15 |
| 2007/0142001 A1* | 6/2007 | Sanders | 455/101 |
| 2007/0218932 A1 | 9/2007 | Sung et al. | |
| 2011/0277582 A1 | 11/2011 | Hilzinger et al. | |
| 2012/0190312 A1 | 7/2012 | Voinigescu et al. | |
| 2013/0156134 A1 | 6/2013 | Galan et al. | |
| 2015/0085708 A1* | 3/2015 | Khlat | 370/277 |

FOREIGN PATENT DOCUMENTS

| | | |
|---|---|---|
| EP | 0771082 A2 | 5/1997 |
| EP | 750826 B1 | 11/2002 |
| EP | 1779692 B1 | 7/2009 |
| WO | 2012057753 A1 | 5/2012 |
| WO | 2013062547 A1 | 5/2013 |
| WO | 2013069015 A1 | 5/2013 |
| WO | 2013096154 A1 | 6/2013 |

OTHER PUBLICATIONS

PCT International Search Report Dated May 8, 2015 for Counterpart Application PCT/US2014/066332.

* cited by examiner

*Primary Examiner* — Hoon J Chung
*Assistant Examiner* — Zhensheng Zhang
(74) *Attorney, Agent, or Firm* — Barbara R. Doutre (57) ABSTRACT

A portable radio communication system for enabling duplex communication on portable radios is provided. The portable radio communication system comprises a host radio having a host radio antenna and an accessory having an accessory antenna. The host radio antenna is operated to receive signals simultaneously on at least two channels during a dual watch mode of operation or receive signals on a single channel during a single watch mode of operation. The portable radio communication system further comprises at least one switch coupled to the host radio antenna and the accessory antenna. The switch enables duplex communication during the dual watch mode of operation or single watch mode of operation by routing transmit signals from the host radio to the accessory antenna for transmission while the host radio antenna receives signals during the dual watch mode of operation or single watch mode of operation.

12 Claims, 9 Drawing Sheets

SYSTEM FOR ENABLING DUPLEX COMMUNICATION ON PORTABLE RADIOS

FIELD OF THE DISCLOSURE

The present disclosure relates generally to portable radios and more particularly to a system for enabling duplex communication on portable radios.

BACKGROUND

Radios such as hand-held two-way radios are utilized within a variety of public safety environments, such as law enforcement, fire rescue, and emergency medical environments to name a few. Currently, public safety personnel working in the field use portable radios for monitoring communications from one or more channels. In such portable radios, when the user presses a push to talk (PTT) switch to respond to any of the channels, all incoming communications are lost. This is also true for radios that are operated to monitor communications on one particular channel at a time. Specifically, this limits the interoperability of portable radios where users are not able to listen to the monitored channels while the radio is operating in transmission mode. In public safety environments, it is possible that an incident commander may miss critical information being transmitted on one or more of the monitored channels when the radio has switched to transmission mode.

Accordingly, there is a need for improving the interoperability of portable radios used in public safety environments.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Briefly, in accordance with the various embodiments, there is described herein, a portable radio communication system for enabling duplex communication on portable radios. The portable radio communication system comprises a host radio having a host radio antenna and an accessory having an accessory antenna. The accessory is removably coupled to the host radio. The host radio antenna is operated to receive signals simultaneously on at least two channels, which may be referred to as a dual watch mode of operation, or receive signals on a single channel, which may be referred to as a single watch mode of operation. The portable radio communication system further comprises at least one switch coupled to the host radio antenna and the accessory antenna. The switch enables duplex communication during the dual watch mode of operation or single watch mode of operation by routing transmit signals from the host radio to the accessory antenna for transmission while the host radio antenna receives signals during the dual watch mode of operation or single watch mode of operation.

Figure 1:
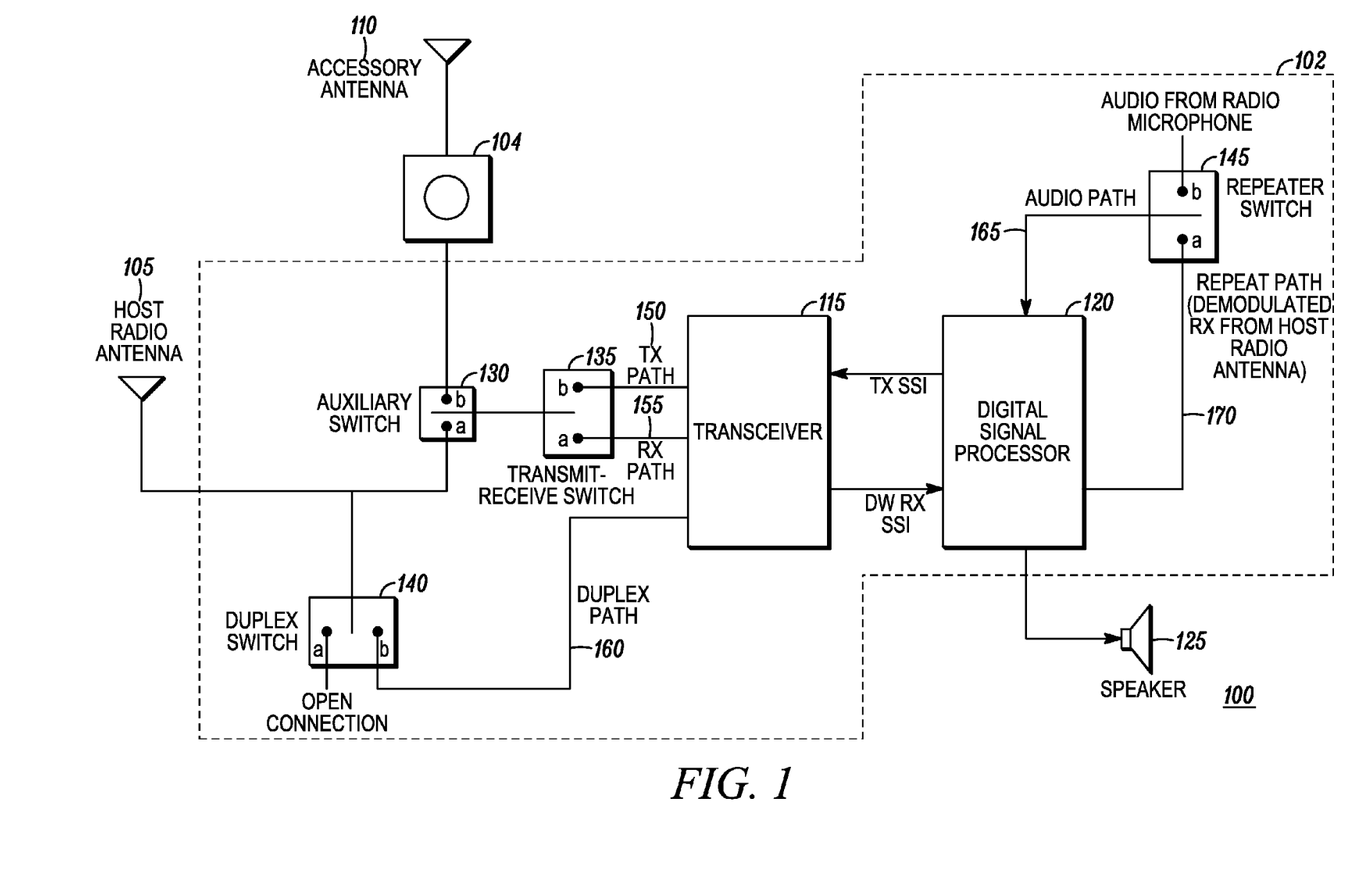
FIG. 1 is a block diagram of a portable radio communication system in accordance with the various embodiments.

FIG. 1 is a block diagram of a portable radio communication system 100. The portable radio communication system 100 comprises a host radio 102 having a host radio antenna 105 and an accessory 104 having an accessory antenna 110. In embodiments of the present disclosure, the accessory 104 is removably coupled to the host radio 102. In accordance with various embodiments, the host radio 102 is a portable two-way communication radio. In one embodiment, the accessory 104 is a public safety microphone (PSM) that when in use is operatively coupled by a cable to the host radio 102, the host radio 102 typically being mounted on a belt of a user. The host radio antenna 105 and accessory antenna 110 include any known or developed structure for receiving electromagnetic energy in the radio frequency (RF) spectrum. In accordance with some embodiments of the present disclosure, the host radio 102 is configured to operate in dual watch mode. As used herein, the term "dual watch mode" signifies a receiver mode of the host radio 102 that allows the user of the radio to listen to audio signals from multiple channels simultaneously. For example, in public safety environments involving an emergency situation, incident commanders will be able to listen to communications from multiple emergency responder groups (for example, firefighters and police groups) simultaneously, either on private or group calls when the host radio 102 operates in dual watch mode.

When the host radio 102 is operated in dual watch mode, the host radio antenna 105 or accessory antenna 110, depending on the configuration, receives (multiple) independent RF signals (also referred to as dual watch signals) simultaneously on at least two frequency channels (also referred to as dual watch channels). Each independent RF signal corresponds to signals received on one particular frequency channel. During dual watch mode of operation, two independent RF signals are received simultaneously to allow the user to monitor communications from two dual watch channels simultaneously.

In one embodiment, the two different dual watch channels that are being monitored may originate from a single communication system, such as a public safety-long term evolution (PS-LTE) communication system or a land mobile radio communication (LMR) system. In another embodiment, each of these two different dual watch channels that are being monitored may originate from a different communication system, for example, a primary channel can originate from a first communication system such as the LMR system, and a non-primary channel can originate from a second communication system such as the PS-LTE system. In some embodiments, the host radio antenna 105 may be a single receiving antenna that simultaneously monitors wireless communications on both the dual watch channels. In another embodiment, the host radio antenna may be a single receiving antenna that periodically toggles to monitor communications on both the dual watch channels. Other antenna arrangements are also feasible.

The host radio 102 further comprises a transceiver 115, a digital signal processor (DSP) 120, speaker 125, and a plurality of switches 130, 135, 140, 145. The transceiver 115 is configured to process RF signals, independently and simultaneously received on at least two frequency channels which may be on different bands during dual watch mode of operation. The transmit/receive duplex channel pair may also be on different bands during dual watch mode of operation. The host radio 102 can operate over a plurality of bands, such as UHF, VHF, and 700/800 MHz, also referred to as multi-band operation. Thus, the two simultaneously received frequency channels may be on different bands. The transceiver 115 further processes transmit signals for transmission to other radios via the host radio antenna 105 or the accessory antenna 110. In this regard, the transceiver 115 includes appropriate circuitry to enable digital or analog communications over a wireless communication channel. The DSP 120 is coupled to the transceiver 115. The DSP 120 demodulates the signals received from the host radio antenna 105 or the accessory antenna 110 through the transceiver 115, and modulates signals for transmission to other radios. The speaker 125, or multiple speakers in dual watch mode, plays audio sounds corresponding to the received RF signals, tones, or alerts within an audible frequency range that can be heard by the user. The host radio 102 further comprises a processor (not shown) that is coupled to the various components shown in FIG. 1. The processor includes one or more microprocessors, microcontrollers, DSPs (digital signal processors), state machines, logic circuitry, or any other device or devices that process information based on operational or programming instructions stored in a memory (not shown). The processor controls the different modes of operation described with reference to FIGS. 2-8 based on user input and/or pre-configured setup.

In accordance with the embodiments of the present disclosure, the portable radio communication system 100 as shown in FIG. 1 enables duplex communication on portable two-way communication radios (host radio 102) during dual watch mode of operation. As used herein, the term "duplex communication" indicates simultaneous reception and transmission of RF signals. In particular, implementation of the embodiments of the present disclosure allows a host radio 102 to receive independent RF signals simultaneously on at least two frequency channels while transmit signals are routed for transmission to other radios on a talk-back frequency channel. In trunking systems, this allows a user to monitor a private and group call simultaneously and continuously without interruption from the transmission operation. In accordance with embodiments of the present disclosure, the duplex communication is made possible in portable two-way communication radios without the use of any physical duplexer filter. In particular, the physical duplexer filter used in conventional systems for facilitating cross-band duplexer mode is eliminated by isolating a frequency band on which RF signals (received in dual watch mode) are received, from the frequency band used for transmitting transmit signals to avoid interference between the receive and transmit signals. In one embodiment, the portable radio communication system 100 allows simultaneous transmission (Tx) at VHF (Very High Frequency) band and reception (Rx) at UHF (Ultra High Frequency) band without interference from Tx. In this embodiment, this is achieved by the combined isolation from the VHF harmonic filter in the transmitter circuitry and RF preselector filtering in the receiver circuitry across the bands thereby eliminating the interference at the co-located antennas (host radio antenna 105 and accessory antenna 110). Embodiments of the present disclosures can also be implemented to enable duplex communication on host radios that are operating in single watch mode. When the host radio 102 is operated in single watch mode, the host radio antenna 105 receives RF signals on a single frequency channel at a particular time.

In accordance with the embodiments of the present disclosure, the plurality of switches 130, 135, 140, 145 are provided within the host radio 102 to isolate the paths in which transmit and receive signals are routed between the antenna (host radio antenna 105 or accessory antenna 110) and the transceiver 115. This isolation of paths between transmit signals and receive signals by the switches enables duplex communication in the host radio 102. In one embodiment, "transmit signals" correspond to audio signals received from a radio microphone (not shown) that are required to be transmitted to other radios via the antenna (host radio antenna 105 or accessory antenna) when PTT switch is switched on. In one embodiment, when cross-band repeater feature is enabled in the host radio 102, "transmit signals" may also correspond to signals received from one antenna (for example, host radio antenna 105) that are demodulated and routed for transmission via other antenna (for example, accessory antenna 110). As used herein, the term "cross-band repeater" refers to a functionality of the portable radio communication system 100 that enables the host radio 102 to repeat communications received in one frequency band on one antenna via the other antenna in another different frequency band.

The plurality of switches comprise an auxiliary switch 130, a transmit-receive switch 135, a duplex switch 140, and a repeater switch 145. In one embodiment, the switches 130, 135, 140, 145 are implemented using a single pole, double throw (SPDT) mechanism. The auxiliary switch 130 is coupled to the host radio antenna 105 at one end and accessory antenna 110 at the other end. The auxiliary switch 130 is operated to switch selectively to couple either the host radio antenna 105 (through contact 'a') or the accessory antenna 110 (through contact 'b') to the transceiver 115. The transmit-receive switch 135 is coupled to the auxiliary switch 130 at one end and transceiver 115 at the other end. The transmit-receive switch 135 is operated to switch selectively to enable either a transmit (Tx) path 150 (through contact 'b') or a receive (Rx) path 155 (through contact 'a') to be established between the auxiliary switch 130 and the transceiver 115. The duplex switch 140 is coupled to the host radio antenna 105 at one end and transceiver 115 at the other end. The duplex switch 140 is operated to switch selectively to maintain an open connection (through contact 'a') or couple the host radio antenna 105 to the transceiver 115 via a duplex path 160 (through contact 'b') established between the duplex switch 140 and the transceiver 115. In accordance with the embodiments of the present disclosure, the duplex path 160 established between the duplex switch 140 and the transceiver 115 creates an additional path that is required to isolate transmit and receive signals for enabling duplex communication in the host radio 102. In embodiments of the present disclosure, the duplex switch 140 switches to maintain an open connection whenever duplex communication is not initiated in the portable radio communication system 100. In other words, when the duplex switch 140 switches to maintain an open connection, only simplex communication is enabled in the portable radio communication system 100, such that either the host radio antenna 105 or the accessory antenna 110 is coupled to the transceiver 115 to either transmit or receive signals at any particular time.

The repeater switch 145 is coupled to the radio microphone at one end and the DSP 120 at the other end. The repeater switch 145 is operated to switch selectively to couple either an audio path 165 (through contact 'b') or a repeat path 170 (through contact 'a') to the transceiver 115 via the DSP 120. When audio signals from the radio microphone are required to be routed for transmission to other radios via the host radio 102, the audio path 165 is established between the transceiver 115 and the repeater switch 145 to route transmit signals corresponding to the audio signals received from the radio microphone to the transceiver 115 via the DSP 120. In cross-band repeater mode, when the signals received by the host radio 102 are required to be repeated to other radios, the repeat path 170 is established between the transceiver 115 and the repeater switch 145 to route demodulated signals back to the transceiver 115 for transmission to other radios. In one embodiment, when the host radio antenna 105 receives independent RF signals simultaneously on multiple channels (also referred to as dual watch channels) during dual watch mode of operation, some or all of the independent RF signals received from a particular antenna (for example, host radio antenna 105) that are required to be repeated are demodulated using the DSP 120 and further routed via the repeat path 170 back to the transceiver 115 for transmission to other radios via the other antenna (for example, accessory antenna 110).

Figure 2:
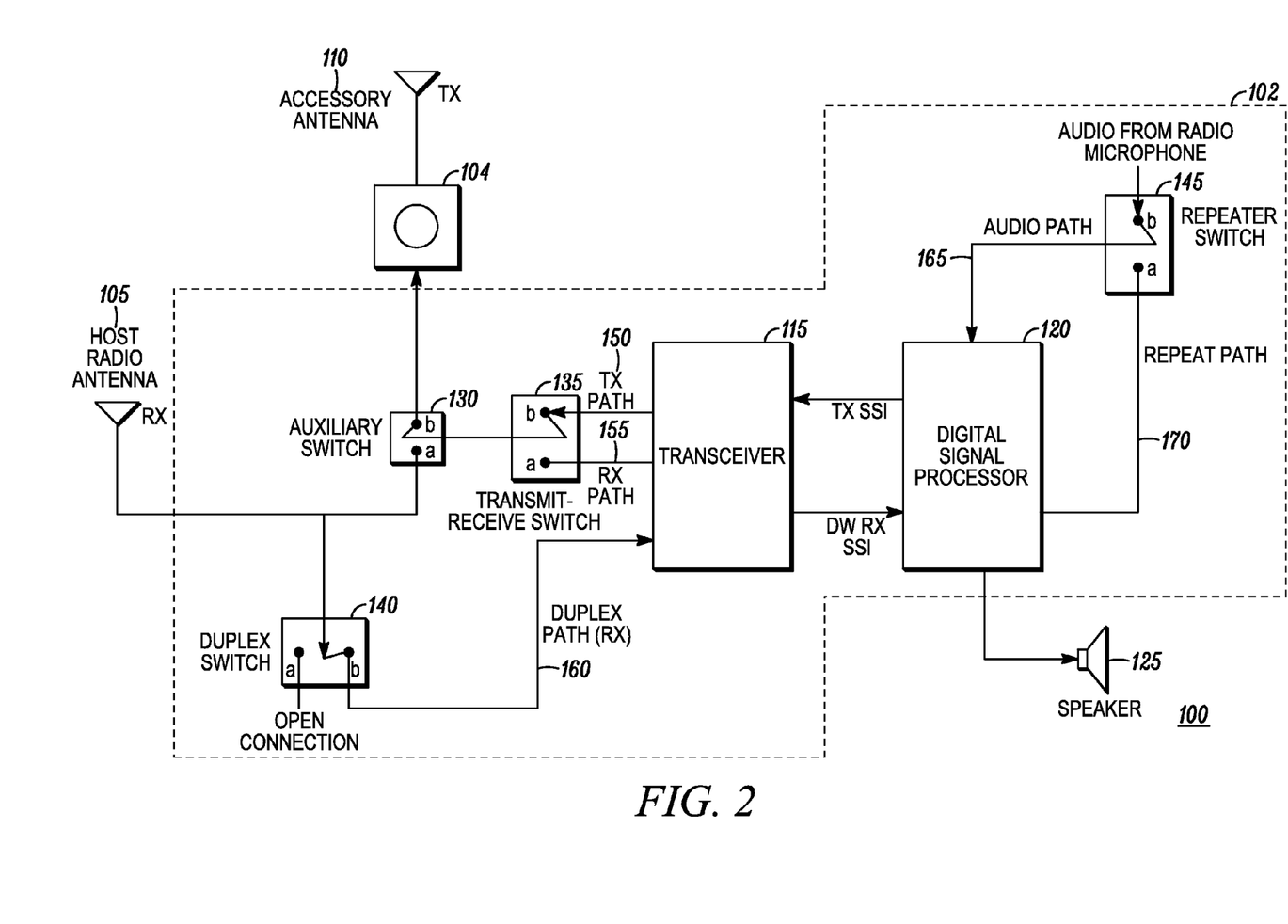
FIG. 2 is a block diagram of a portable radio communication system of FIG. 1 with a host radio antenna operating in dual watch mode and an accessory antenna operating in transmission mode in accordance with the various embodiments.

Referring to FIG. 2, a block diagram of the portable radio communication system 100 of FIG. 1 is shown with a host radio antenna 105 operating in dual watch mode and an accessory antenna 110 operating in transmission mode in accordance with the various embodiments. In this embodiment, "transmission mode" is initiated when a user of the host radio 102 presses a PTT switch (either disposed within the accessory 104 or the host radio 102) to respond to communications received on the dual watch channels from the host radio antenna 105. As used herein, the term "transmission mode" refers to the operation of the accessory antenna 110 during which transmit signals processed by the transceiver 115 in the host radio 102 are ready for transmission (or being transmitted from the transceiver 115) to other radios via the accessory antenna 110. In accordance with embodiments of the present disclosure, duplex communication is enabled in the portable radio communication system 100 whenever the transmission mode is initiated during dual watch mode of operation, such that, the host radio 102 is able to receive dual watch signals via the host radio antenna 105 while simultaneously transmitting transmit signals to other radios via the accessory antenna 110. In accordance with various embodiments of the present disclosure, duplex communication during dual watch mode of operation is enabled by selectively switching the switches 130, 135, 140, 145. In one embodiment as shown in FIG. 2, when duplex communication is initiated during dual watch mode of operation, the duplex switch 140 couples the host radio antenna 105 to the transceiver 115 via the duplex path 160 to route the dual watch signals (Rx) received from the host radio antenna 105 to the transceiver 115. Further, the auxiliary switch 130 couples the accessory antenna 110 to the transceiver to route the transmit signals (Tx) processed by the transceiver 115 to the accessory antenna 110 via the transmit-path 150 enabled by the transmit-receive switch 135 for transmission to other radios. In this embodiment, the paths (transmit path 150 for transmit signals and duplex path 160 for dual watch signals) used for transmission and reception are isolated by selectively switching the duplex switch 140 and auxiliary switch 130 to perform duplex communication. As shown in FIG. 2, the repeater switch 145 is coupled to the DSP 120 via the audio path 165 to enable routing of audio signals from the radio microphone to the transceiver 115 for transmission to other radios via the accessory antenna 110.

The embodiment shown in FIG. 2 can be similarly applied to enable duplex communication in host radios that are operating in simplex communication mode when RF signals are being received on one particular channel at a time during single watch mode of operation. In operation, the duplex path 160 is enabled by the duplex switch 140 to route signals received in single watch mode from the host radio antenna 105 to the transceiver 115 while the transmit-receive switch 135 enables the transmit path 150 to simultaneously allow for transmission of signals to other radios via the accessory antenna 110.

Figure 3:
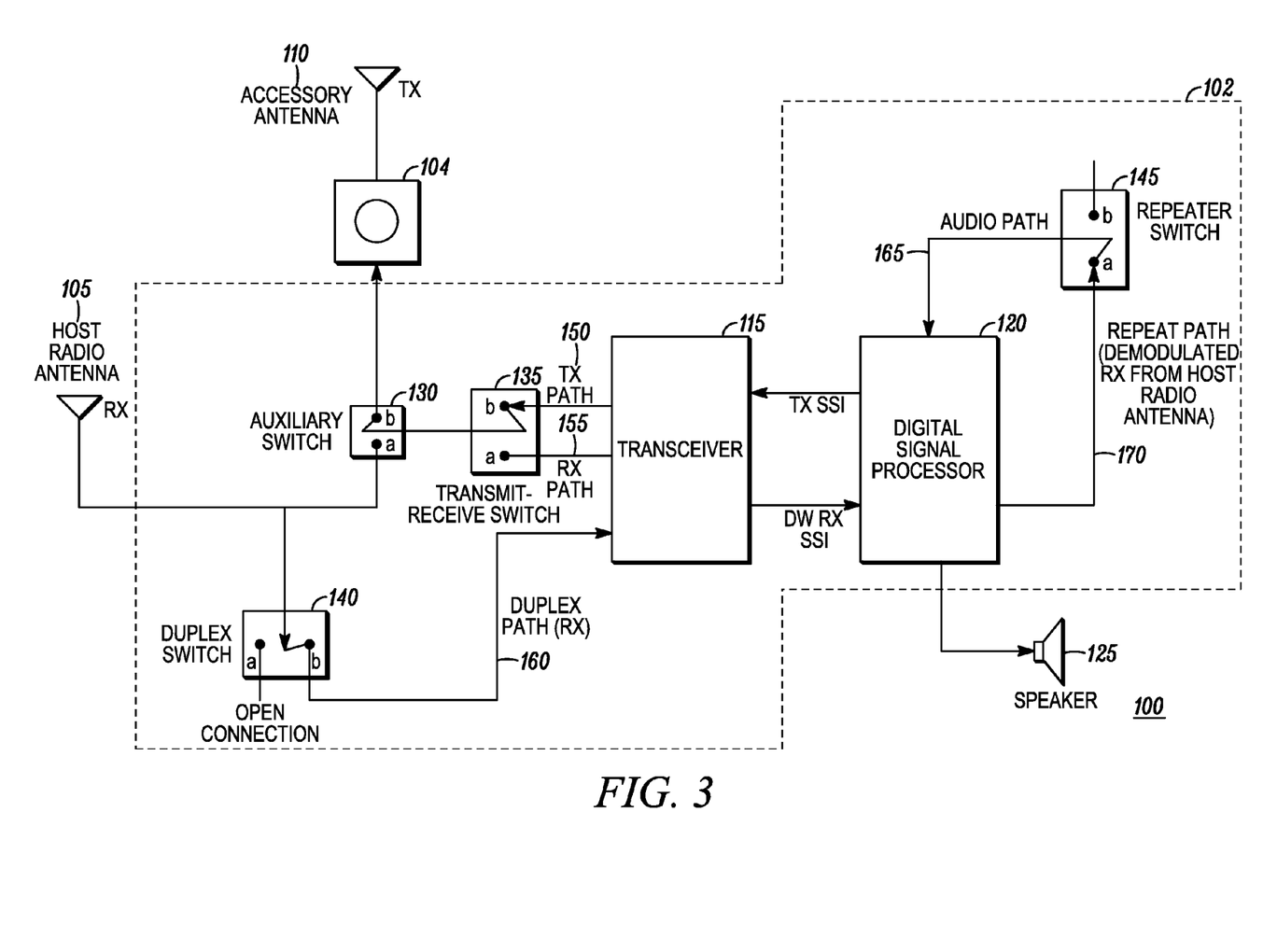
FIG. 3 is a block diagram of a portable radio communication system of FIG. 1 functioning as a cross-band repeater with a host radio antenna operating in dual watch mode and an accessory antenna operating in transmission mode in accordance with the various embodiments.

Referring to FIG. 3, a block diagram of the portable radio communication system 100 of FIG. 1 is shown functioning as a cross-band repeater with a host radio antenna 105 operating in dual watch mode and an accessory antenna 110 operating in transmission mode in accordance with the various embodiments. In this embodiment, "transmission mode" is initiated when one or more independent RF signals corresponding to the dual watch signals are required to be repeated to other radios using the cross-band repeater function of the portable radio communication system 100. In this embodiment, the term "transmission mode" refers to the operation of the accessory antenna 110 during which transmit signals (i.e. demodulated signals corresponding to the dual watch signals received from the host radio antenna 105) processed by the transceiver 115 in the host radio 102 are ready for transmission (or being transmitted from the transceiver 115) to other radios via the accessory antenna 110. In accordance with embodiments of the present disclosure, duplex communication is enabled in the portable radio communication system 100 whenever the transmission mode is initiated during dual watch mode of operation, such that, the host radio antenna 105 is able to receive dual watch signals via the host radio antenna 105 while simultaneously functioning as a cross-band repeater for repeating received communications to other radios via the accessory antenna 110. In accordance with various embodiments of the present disclosure, duplex communication during dual watch mode of operation is enabled by selectively switching the switches 130, 135, 140, 145.

In one embodiment as shown in FIG. 3, when duplex communication is initiated during dual watch mode of operation, the duplex switch 140 couples the host radio antenna 105 to the transceiver 115 via the duplex path 160 to route the dual watch signals received from the host radio antenna 105 to the transceiver 115. In this embodiment, the repeater switch 145 couples the repeat path 170 to the transceiver through the DSP 120 to allow the portable radio communication system 100 to function as a cross-band repeater. In particular, the DSP 120 demodulates the received dual watch signals, and further the repeater switch 145, by coupling the repeat path 170 to the transceiver 115, allows routing of the demodulated dual watch signals to the transceiver 115 for transmission to other radios via the accessory antenna 110. In one embodiment, the repeater switch 145 is pre-configured or instructed to selectively repeat dual watch signals received on only one particular frequency channel among the multiple dual watch channels when the host radio 102 is functioning as a cross-band repeater. In another embodiment, the repeater switch 145 is pre-configured or instructed to repeat all dual watch signals (i.e. repeat all RF signals independently and simultaneously received on different channels during the dual watch mode of operation) when the portable radio communication system 100 is functioning as a cross-band repeater.

The embodiment shown in FIG. 3 can be similarly applied to enable duplex communication in host radios that are operating in simplex communication mode when RF signals are being received on one particular channel at a time during single watch mode of operation. In operation, the duplex path 160 is enabled by the duplex switch 140 to route signals received in single watch mode from the host radio antenna 105 to the transceiver 115 while the transmit-receive switch 135 enables the transmit path 150 to simultaneously allow for transmission of signals (demodulated signals corresponding to the signals received in single watch mode via the host radio antenna 105) to other radios via the accessory antenna 110.

Figure 4:
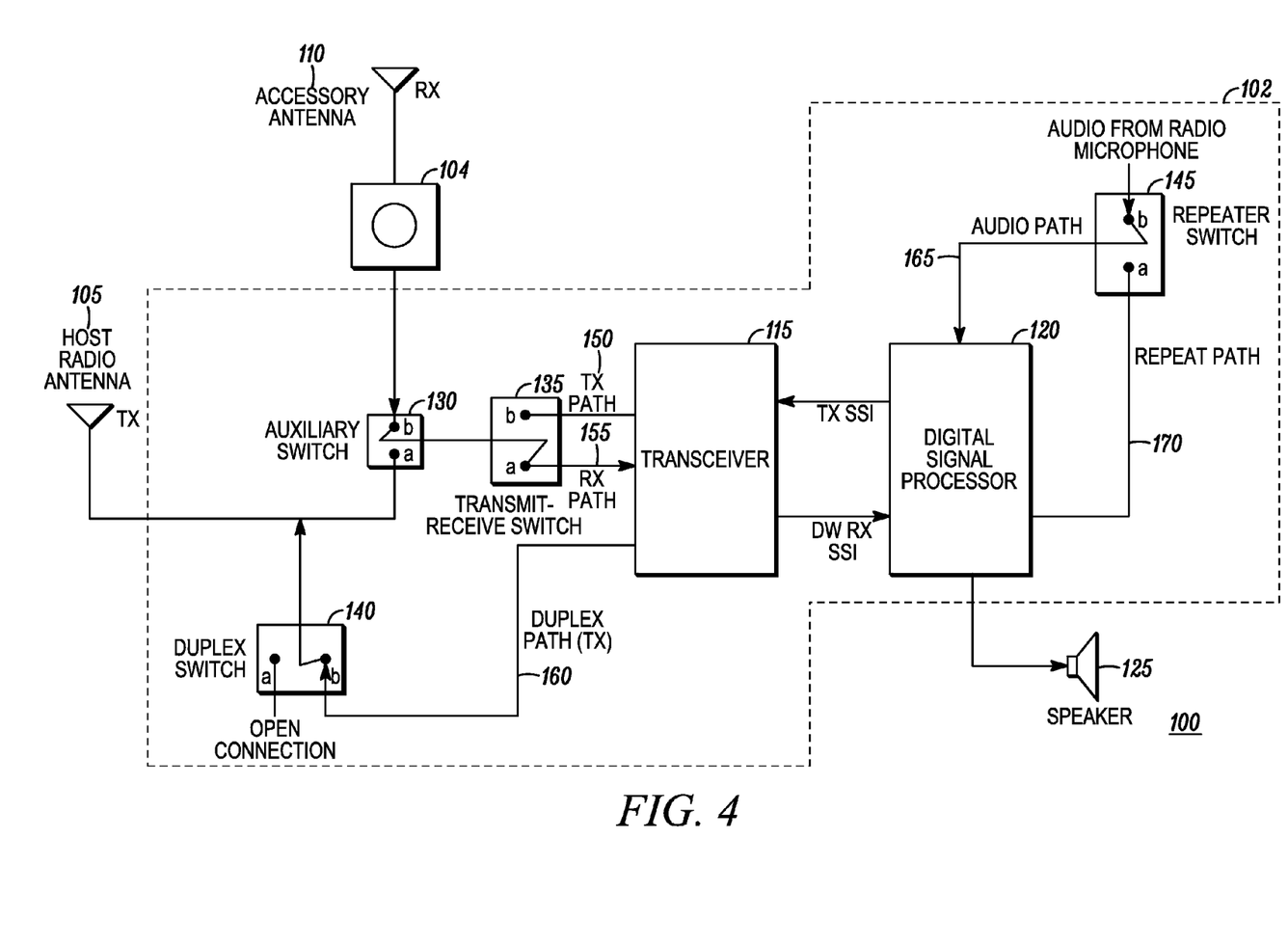
FIG. 4 is a block diagram of a portable radio communication system of FIG. 1 with an accessory antenna operating in dual watch mode and a host radio antenna operating in transmission mode in accordance with the various embodiments.

Referring to FIG. 4, a block diagram of the portable radio communication system 100 of FIG. 1 is shown with an accessory antenna 110 operating in dual watch mode and a host radio antenna 105 operating in transmission mode in accordance with the various embodiments. In accordance with some embodiments, the portable radio communication system 100 is configured to use the accessory antenna 110 for receiving dual-watch signals from other radios while the host radio antenna 105 is used to transmit signals to other radios. In these embodiments, "transmission mode" is initiated when user of the host radio 102 presses a PTT switch (either disposed within the accessory 104 or the host radio 102) to respond to communications received on the dual watch channels via the accessory antenna 110. As used herein, the term "transmission mode" refers to the operation of the host radio antenna during which transmit signals processed by the transceiver 115 in the host radio 102 are ready for transmission (or being transmitted from the transceiver 115) to other radios via the host radio antenna 105. In accordance with embodiments of the present disclosure, duplex communication is enabled in the portable radio communication system 100 whenever the transmission mode is initiated during dual watch mode of operation, such that, the host radio 102 is able to receive dual watch signals via the accessory antenna 110 while simultaneously transmitting transmit signals to other radios via the host radio antenna 105. In accordance with various embodiments of the present disclosure, duplex communication during dual watch mode of operation is enabled by selectively switching the switches 130, 135, 140, 145.

In one embodiment as shown in FIG. 4, when duplex communication is initiated during dual watch mode of operation, the duplex switch 140 couples the host radio antenna 105 to the transceiver 115 via the duplex path 160 to route the transmit signals received from the transceiver to other radios via the host radio antenna 105. Further, the auxiliary switch 130 couples the accessory antenna 110 to the transceiver 115 to route the transmit signals processed by the transceiver 115 to the accessory antenna 110 via the receive path 155 enabled by the transmit-receive switch 135 for routing the dual watch signals received from the accessory antenna 110 to the transceiver 115. In this embodiment, the paths (duplex path 160 for transmit signals and receive path 155 for dual watch signals) used for transmission (Tx) and reception (Rx) are isolated by selectively switching the duplex switch 140 and auxiliary switch 130 to enable duplex communication in the host radio 102. As shown in FIG. 4, the repeater switch 145 is coupled to the DSP 120 via the audio path 165 to enable routing of audio signals from the radio microphone to the transceiver 115 for transmission to other radios via the host radio antenna 105.

The embodiment shown in FIG. 4 can be similarly applied to enable duplex communication in host radios that are operating in simplex communication when RF signals are being received on one particular channel at a time during single watch mode of operation. In operation, the receive path 155 is enabled by the transmit-receive switch 135 to route signals received in single watch mode via the accessory antenna 110 to the transceiver 115 while the duplex switch 140 enables the duplex path 160 to simultaneously allow for transmission of signals to other radios via the host radio antenna 105.

Figure 5:
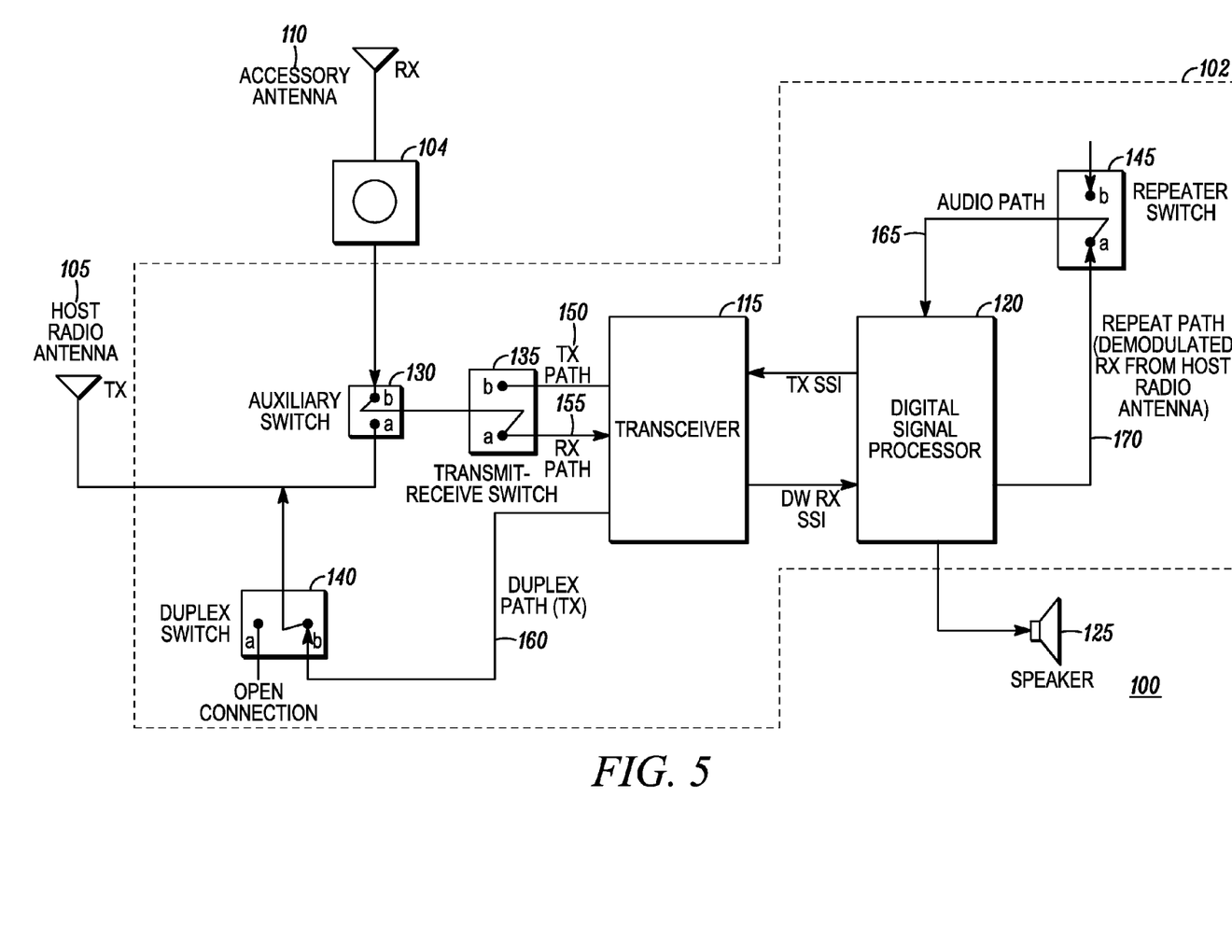
FIG. 5 is a block diagram of a portable radio communication system of FIG. 1 functioning as a cross-band repeater with a host radio antenna operating in transmission mode and an accessory antenna operating in dual watch mode in accordance with various embodiments.

Referring to FIG. 5, a block diagram of the portable radio communication system 100 of FIG. 1 is shown functioning as a cross-band repeater with an accessory antenna 110 operating in dual watch mode and a host radio antenna 105 operating in transmission mode in accordance with the various embodiments. In this embodiment, "transmission mode" is initiated when one or more independent RF signals corresponding to the dual watch signals are required to be repeated to other radios using the cross-band repeater function of the portable radio communication system 100. In this embodiment, the term "transmission mode" refers to the operation of the host radio antenna 105 during which transmit signals (i.e. demodulated signals corresponding to the dual watch signals received from the accessory antenna 110) processed by the transceiver 115 in the host radio 102 are ready for transmission (or being transmitted from the transceiver 115) to other radios via the host radio antenna 105. In accordance with embodiments of the present disclosure, duplex communication is enabled in the portable radio communication system 100 whenever the transmission mode is initiated during dual watch mode of operation, such that, the host radio antenna 105 is able to receive dual watch signals via the accessory antenna 110 while simultaneously functioning as a cross-band repeater for repeating received communications to other radios via the host radio antenna 105. In accordance with various embodiments of the present disclosure, duplex communication during dual watch mode of operation is enabled by selectively switching the switches 130, 135, 140, 145.

In one embodiment as shown in FIG. 5, the auxiliary switch 130 couples the accessory antenna 110 to the transceiver 115 via the receive path 155 enabled by the transmit-receive switch 135 to route the dual watch signals received from the accessory antenna 110 to the transceiver 115 during the dual watch mode of operation. When duplex communication is initiated during the dual watch mode of operation, the duplex switch 140 couples the host radio antenna 105 to the transceiver 115 via the duplex path 160 to route the transmit signals received from the transceiver 115 for transmission via the host radio antenna 105. In this embodiment, the repeater switch 145 couples the repeat path 170 to the transceiver through the DSP 120 to allow the portable radio communication system 100 to function as a cross-band repeater. In particular, the DSP 120 demodulates the dual watch signals received from the accessory antenna 110, and further the repeater switch 145, by coupling the repeat path 170 to the transceiver 115, allows routing of the demodulated dual watch signals to the transceiver 115 for transmission to other radios via the host radio antenna 105. In one embodiment, the repeater switch 145 is pre-configured or instructed to selectively repeat dual watch signals received on only one particular frequency channel among the multiple dual watch channels when cross-band repeater function is enabled. In another embodiment, the repeater switch 145 is pre-configured or instructed to repeat all dual watch signals (i.e. repeat all RF signals independently and simultaneously received on different channels during the dual watch mode of operation) when the portable radio communication system 100 is functioning as a cross-band repeater.

The embodiment shown in FIG. 5 can be similarly applied to enable duplex communication in host radios that are operating in simplex communication when RF signals are being received on one particular channel at a time during single watch mode of operation. In operation, the receive path 155 is enabled by the transmit-receive switch 135 to route signals received in single watch mode from the accessory antenna 110 to the transceiver 115 while the duplex switch 140 enables the duplex path 160 to simultaneously allow for transmission of signals (demodulated signals corresponding to the signals received in single watch mode via the accessory antenna 110) to other radios via the host radio antenna 105.

Figure 6:
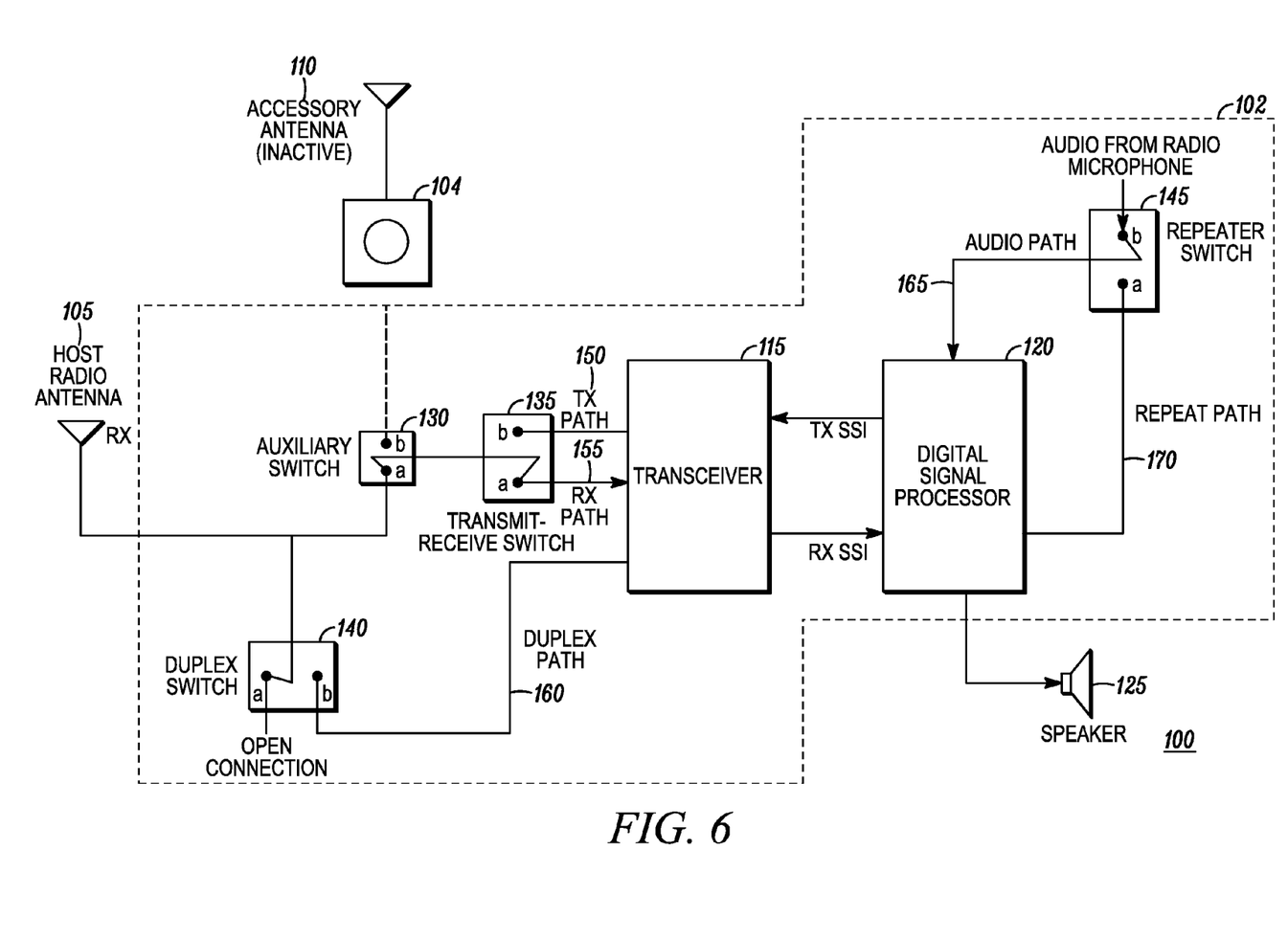
FIG. 6 is a block diagram of a portable radio communication system of FIG. 1 with a host radio antenna operating in single watch mode while the accessory antenna is inactive in accordance with various embodiments.

Referring to FIG. 6, a block diagram of the portable radio communication system 100 of FIG. 1 is shown with a host radio antenna 105 operating in single watch mode while the accessory antenna 110 is inactive in accordance with various embodiments. In one embodiment, the portable radio communication system 100 can also be used to support simplex communication to receive signals on one particular frequency channel at a time during single watch mode of operation when the accessory antenna 110 is inactive. The accessory antenna 110 may be inactive either when it is disengaged from a port of the host radio 102 or when it is powered off. In this embodiment, the auxiliary switch 130 couples the host radio antenna 105 to the transceiver 115 via the receive path 155 enabled by the transmit-receive switch 135 to route the signals received from the host radio antenna 105 to the transceiver 115. In this case, the duplex switch 140 maintains the open connection. In the example shown in FIG. 6, when the user presses the PTT switch to respond to communications received on the host radio antenna 105, the repeater switch 145 couples the audio path 165 to the transceiver 115 to allow audio signals from the radio microphone to be transmitted via the host radio antenna 105.

Figure 7:
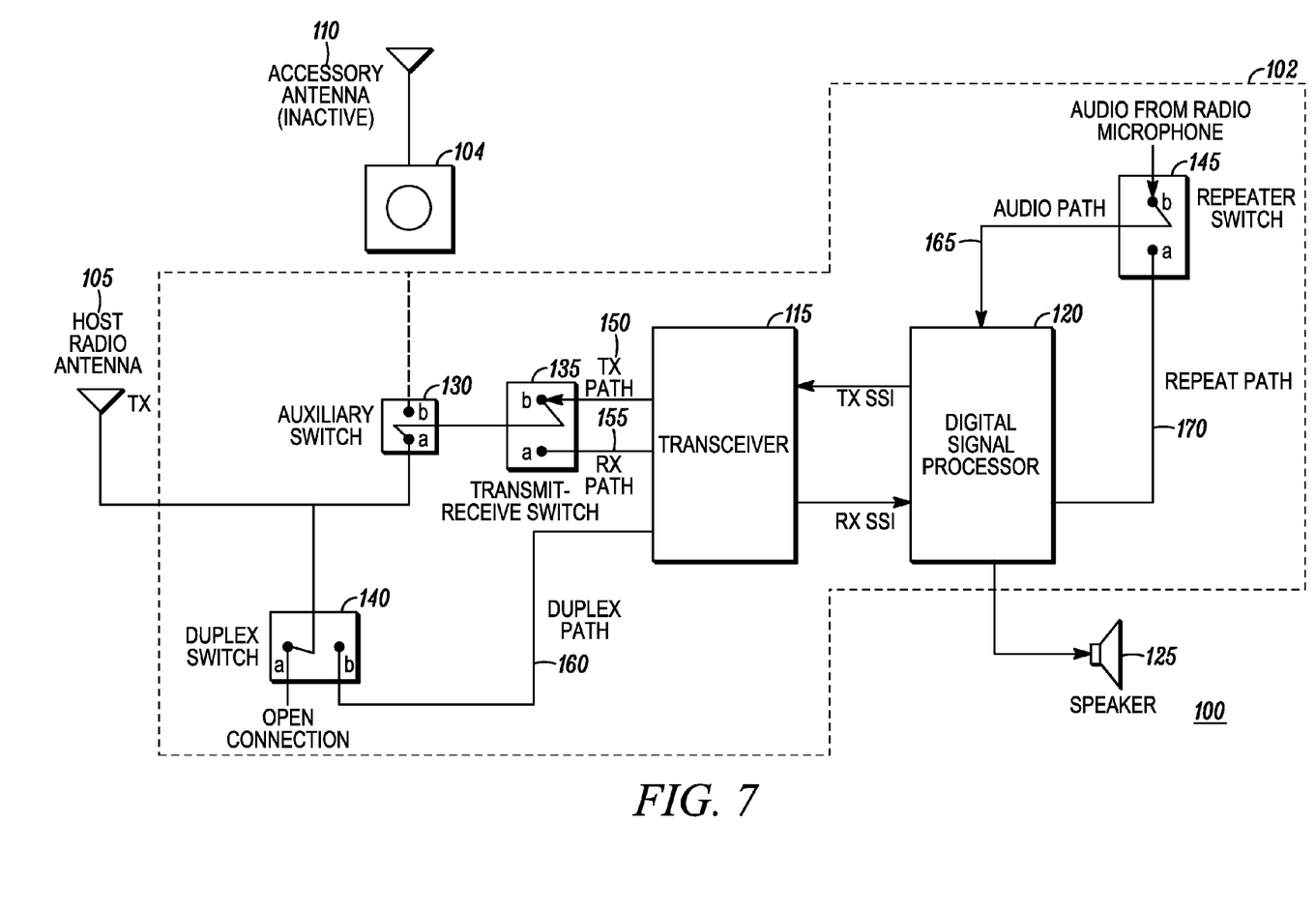
FIG. 7 is a block diagram of a portable radio communication system of FIG. 1 with a host radio antenna operating in transmission mode while the accessory antenna is inactive in accordance with the various embodiments.

Referring to FIG. 7, a block diagram of the portable radio communication system 100 of FIG. 1 is shown with a host radio antenna 105 operating in transmission mode while the accessory antenna 110 is inactive in accordance with various embodiments. In one embodiment, the portable radio communication system 100 can also be used to support simplex communication to transmit signals via the host radio antenna 105 when the accessory antenna 110 is inactive. The accessory antenna 110 may be inactive either when it is disengaged from a port of the host radio 102 or when it is powered off. In one embodiment, when the user presses the PTT switch to respond to communications received during dual watch mode or single watch mode of operation, the auxiliary switch 130 switches to couple the host radio antenna 105 to the transceiver 115 via the transmit path 155 enabled by the transmit-receive switch 135 to route the transmit signals from the transceiver 115 for transmission to other radios via the host radio antenna 105. Further, in this case, the duplex switch 140 maintains the open connection. In the example shown in FIG. 7, when the user presses the PTT switch to respond to communications, the repeater switch 145 couples the audio path 165 to the transceiver 115 to allow audio signals from the radio microphone to be transmitted to other radios via the host radio antenna 105.

Figure 8:
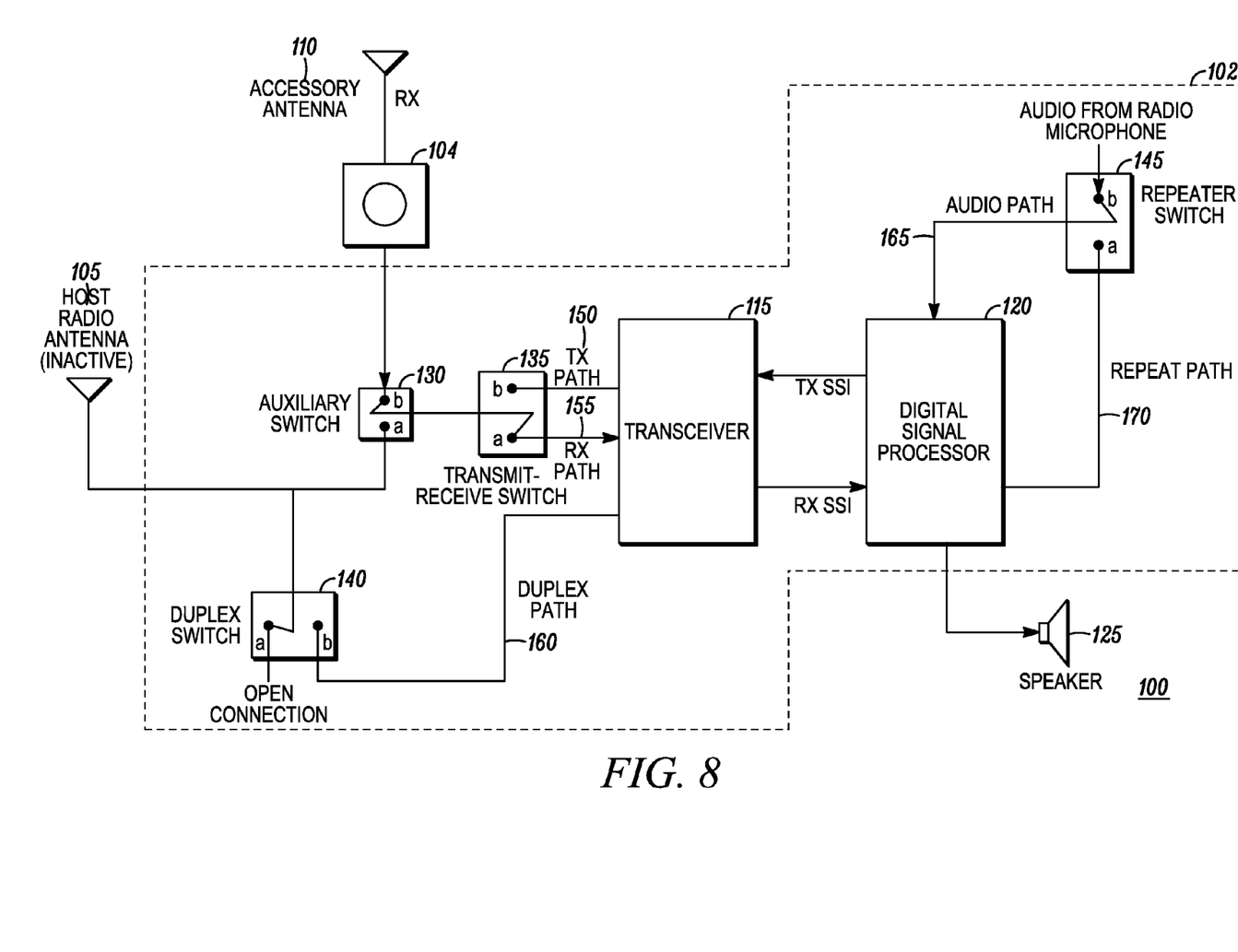
FIG. 8 is a block diagram of a portable radio communication system of FIG. 1 with an accessory antenna operating in single watch mode while a host radio antenna is inactive in accordance with the various embodiments.

Referring to FIG. 8, a block diagram of the portable radio communication system 100 of FIG. 1 is shown with an accessory antenna 110 operating in single watch mode while a host radio antenna 105 is inactive. In one embodiment, the portable radio communication system 100 can also be used to support simplex communication by engaging an accessory antenna 110 to the host radio 102. In this embodiment, the accessory antenna 110 is used to receive signals on one particular frequency channel at a time during single watch mode of operation when the host radio antenna 105 is inactive. In one embodiment, when the user engages the accessory antenna 110 to the host radio 102 to listen to communications received on a frequency channel, the host radio antenna 105 may be temporarily inactivated to allow all communications to be routed through the accessory antenna 110. In this case, the auxiliary switch 130 switches to couple the accessory antenna 110 to a receive path 155 enabled by the transmit-receive switch 135 to route the signals received from the accessory antenna 110 to the transceiver 115. Further, the duplex switch 140 switches to maintain the open connection. In the example shown in FIG. 8, when the user presses the PTT switch to respond to communications received on the accessory antenna 110, the repeater switch 145 couples the audio path 165 to the transceiver 115 to allow audio signals from the radio microphone to be transmitted via the accessory antenna 110. In this case, as further described below with reference to FIG. 9, the auxiliary switch 130 switches to couple the accessory antenna 110 to the transmit path 150 to enable transmission of signals from the host radio 102 to other radios via the accessory antenna 110.

Figure 9:
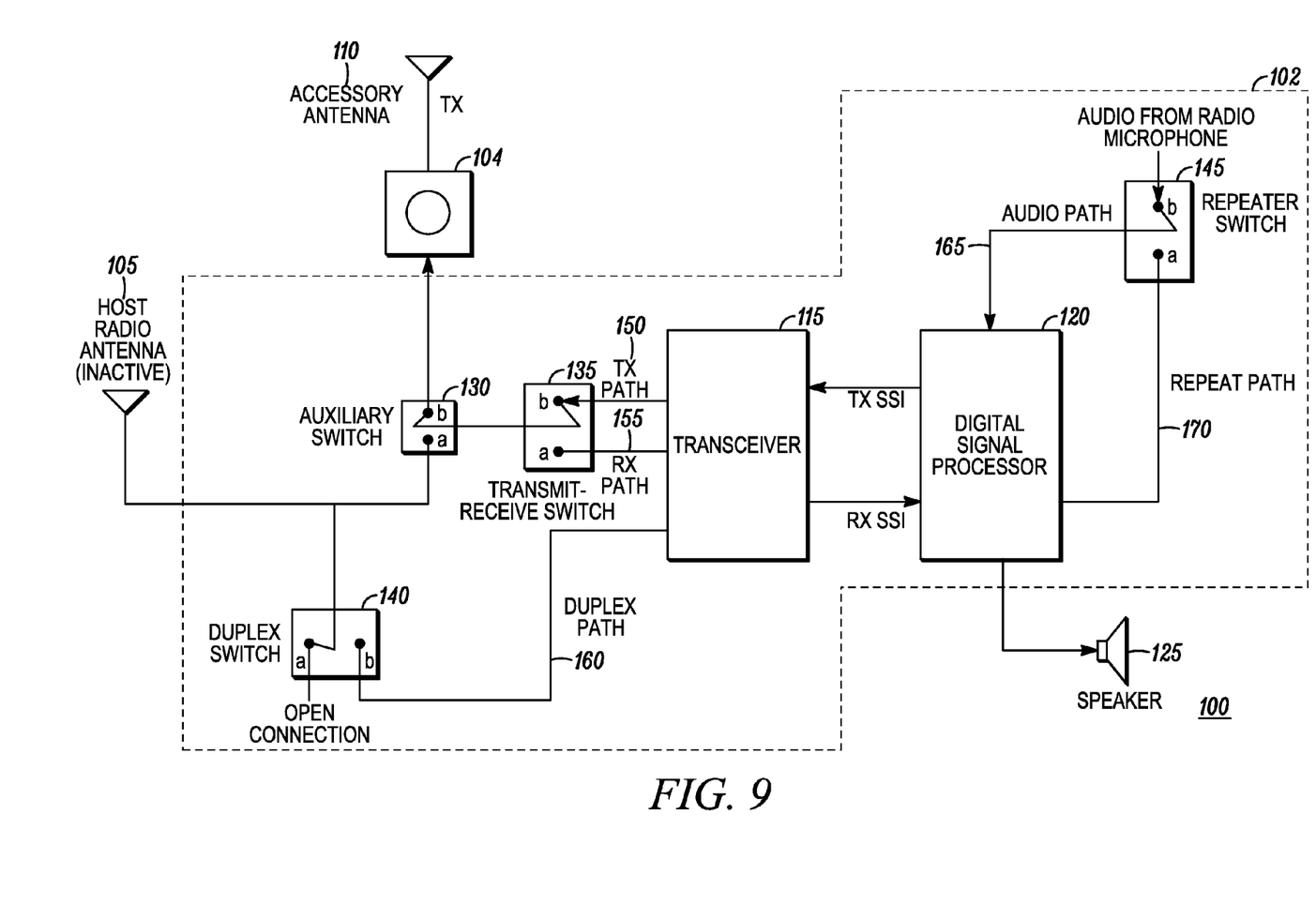
FIG. 9 is a block diagram of a portable radio communication system of FIG. 1 with an accessory antenna operating in transmission mode while a host radio antenna is inactive in accordance with the various embodiments.

Referring to FIG. 9, a block diagram of the portable radio communication system 100 of FIG. 1 is shown with an accessory antenna 110 operating in transmission mode while a host radio antenna 105 is inactive in accordance with the various embodiments. In one embodiment, the portable radio communication system 100 can also be used to support simplex communication to transmit signals to other radios by engaging an accessory antenna 110 to the host radio 102. In this embodiment, when the accessory antenna 110 is engaged to the host radio 102 to respond to communications the audio path 165 to the transceiver 115 to allow audio signals from the radio microphone to be transmitted to other radios via the host radio antenna 105.

A summary of the various modes of operation described with reference to FIGS. 2-8 is provided in the following table:—

| Operational Mode | | Switch Connections (a/b) | | | | |
| --- | --- | --- | --- | --- | --- | --- |
| Host radio antenna | Accessory antenna | Auxiliary Switch | Transmit-Receive Switch | Duplex Switch | Repeater Switch | Mode Description |
| Dual Watch Rx | Tx | b | b | b | b | Duplex communication in dual watch mode |
| Dual Watch Rx | Tx | b | b | b | a | Duplex communication in dual watch and cross-band repeater modes |
| Tx | Dual Watch Rx | b | a | b | b | Duplex communication in dual watch mode |
| Tx | Dual Watch Rx | b | a | b | a | Duplex communication in dual watch and cross-band repeater modes |
| Rx | Inactive | a | a | a | b | Simplex receive operation without accessory antenna |
| Tx | Inactive | a | b | a | b | Simplex transmit operation without accessory antenna |
| Inactive | Rx | b | a | a | b | Simplex receive operation with accessory antenna |
| Inactive | Tx | b | b | a | b | Simplex transmit operation with accessory antenna | received during the single watch mode or dual watch mode of operation, the host radio antenna 105 may be temporarily inactivated to allow all communications to be routed through the accessory antenna 110. When the user presses the PTT switch to respond to communications received during dual watch mode or single watch mode of operation, the auxiliary switch 130 switches to couple the accessory antenna 110 to the transceiver 115 via the transmit path 155 enabled by the transmit-receive switch 135 to route the transmit signals from the transceiver 115 for transmission to other radios via the accessory antenna 110. Further, the duplex switch 140 switches to maintain the open connection. In the example shown in FIG. 9, when the user presses the PTT switch to respond to communications, the repeater switch 145 couples Accordingly, the implementation of the various embodiments of the present disclosure allows a user to perform duplex communication on portable radios. While mobile phones typically have separate antenna for receiving and transmitting signals and can theoretically operate in duplex mode by physically isolating antennas, dual antenna ports implemented on a mobile are not feasible on portable radios. Portable radios have a much more compromised design where both transmitter and receiver share the same main antenna (host radio antenna 105) or PSM antenna (accessory antenna 110). Embodiments of the present disclosure described with reference to FIGS. 1-9 enable portable radios to perform duplex communication while operating over a plurality of bands, such as UHF, VHF, and 700/800 MHz. In particular, the dual watch operation of portable radios is enhanced so that the communications on the dual watch channels are not lost when the user presses a PTT switch to respond to either of the dual watch channels. Embodiments of the present disclosure enable this cross-band duplexer feature by combining the functionality of dual watch, PSM antenna, and switching mechanisms to eliminate the loss of audio so as to not only allow monitoring of both dual watch channels while transmitting simultaneously but also an additional cross-band duplex, repeater, and trunking features which were not feasible in conventional portable radios. Embodiments of the present disclosure also enable a "virtual duplexer" functionality on portable radios based on the isolation inherent in all band capable radio allowing transmission on one band and reception on a different band. This virtual duplexer functionality also eliminates the need for a hardware duplexer used in conventional radios.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a, critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable radio communication system, comprising:
a host radio;
a digital signal processor (DSP) in the host radio;
a host radio antenna, the host radio antenna operated to receive receive signals (Rx) simultaneously on at least two independent frequency channels on different bands during a dual watch mode of operation;
an accessory removably coupled to the host radio, the accessory having an accessory antenna; and
a virtual duplexer enabled for frequency band dependent isolation of signals without the use of a physical duplexer via a plurality of switches coupled between a transceiver of the host radio and the accessory antenna, the plurality of switches enabling duplex communication during the dual watch mode of operation and
wherein transmit signals (Tx) are routed from the transceiver to the accessory antenna, and receive signals (Rx) are routed from the host radio antenna on a first frequency band, the receive signals (Rx) being further routed as a demodulated signal from the DSP back to the transceiver of the host radio for modulation on a second frequency band during the dual watch mode of operation for simultaneous transmission, as a modulated signal, thereby repeating the receive signals (Rx) from the first frequency band to other radios on the second frequency band via the accessory antenna, the second frequency band being different from the first frequency band.

2. The portable radio communication system of claim 1, wherein the plurality of switches comprise:
an auxiliary switch coupled to the host radio antenna at one end and accessory antenna at the other end, the auxiliary switch operated to switch selectively to couple one of the host radio antenna and the accessory antenna to the transceiver; and
a transmit-receive switch coupled to the auxiliary switch at one end and transceiver at the other end, the transmit-receive switch operated to switch selectively to enable one of a transmit path and a receive path to be established between the auxiliary switch and the transceiver; and
a duplex switch coupled to the host radio antenna at one end and transceiver at the other end, the duplex switch operated to switch selectively to maintain one of an open connection and couple the host radio antenna to the transceiver via a duplex path established between the duplex switch and the transceiver.

3. The portable radio communication system of claim 2, wherein when duplex communication is initiated during the dual watch mode of operation, the duplex switch couples the host radio antenna to the transceiver via the duplex path to route the receive signals Rx received from the host radio antenna to the transceiver and the auxiliary switch couples the accessory antenna to the transceiver to route the transmit signals Tx processed by the transceiver to the accessory antenna via the transmit path enabled by the transmit-receive switch for transmission.

4. The portable radio communication system of claim 1, wherein the plurality of switches further comprise a repeater switch coupled to a radio microphone at one end and the digital signal processor at the other end, the repeater switch operated to switch selectively between:
   an audio path to the transceiver, the audio path established between the transceiver and the repeater switch to route the transmit signals Tx corresponding to an audio signal received from the radio microphone to the transceiver via the digital signal processor; and
   a repeat path to the transceiver, the repeat path established between the transceiver and the repeater switch to route demodulated signals corresponding to the receive signals Rx received from the host radio antenna to the transceiver via the digital signal processor for simultaneous transmission to other radio devices via the accessory antenna.

5. The portable radio communication system of claim 1, wherein the host radio comprises a portable two-way public safety radio and the accessory comprises a public safety microphone operatively coupled by a cable to the portable two-way public safety radio.

6. The portable radio communication system of claim 1, wherein the host radio comprises a portable two-way radio having a push-to-talk (PTT) switch, and wherein communications during the dual watch mode of operation are not lost when the PTT switch is enabled to respond to either dual watch channels of the dual watch mode of operation.

7. A portable radio communication system, comprising:
   a host radio;
   a digital signal processor (DSP) in the host radio;
   a host radio antenna, the host radio antenna operated to transmit signals when transmission of transmit signals (Tx) is initiated;
   an accessory removably coupled to the host radio, the accessory having an accessory antenna, the accessory antenna operated to receive receive signals (Rx) simultaneously on at least two independent frequency channels on different bands during a dual watch mode of operation; and
a virtual duplexer enabled for frequency band dependent isolation of signals without the use of a physical duplexer via a plurality of switches coupled between a transceiver of the host radio and the accessory antennas, the plurality of switches for enabling duplex communication during the dual watch mode of operation by routing transmit signals (Tx) from the transceiver to the host radio antenna for transmission, and routing the receive signals (Rx) from the accessory antenna on a first frequency band, as a demodulated signal from the DSP, back to the transceiver of the host radio for modulation on a second frequency band during the dual watch mode of operation for simultaneous transmission, as a modulated signal, thereby repeating from the receive signals (Rx) from the first frequency band to other radios on the second frequency band via the host antenna, the first frequency band being different than the second frequency band.

8. The portable radio communication system of claim 7, wherein the plurality of switches comprise:
   an auxiliary switch coupled to the host radio antenna at one end and accessory antenna at the other end, the auxiliary switch operated to switch selectively to couple one of the host radio antenna and the accessory antenna to the transceiver; and
   a transmit-receive switch coupled to the auxiliary switch at one end and transceiver at the other end, the transmit-receive switch operated to switch selectively to enable one of a transmit path and a receive path to be established between the auxiliary switch and the transceiver; and
   a duplex switch coupled to the host radio antenna at one end and transceiver at the other end, the duplex switch operated to switch selectively to maintain one of an open connection and couple the host radio antenna to the transceiver via a duplex path established between the duplex switch and the transceiver.

9. The portable radio communication system of claim 8, wherein when duplex communication is initiated during the dual watch mode of operation, the duplex switch couples the host radio antenna to the transceiver via the duplex path to route the transmit signals Tx processed by the transceiver to the host radio antenna via the duplex path for transmission and the auxiliary switch maintains the coupling of the accessory antenna to the transceiver to continue routing the receive signals Rx received from the accessory antenna to the transceiver via the receive path enabled by the transmit-receive switch.

10. The portable radio communication system of claim 8, wherein the plurality of switches further comprise a repeater switch coupled to a radio microphone at one end and a digital signal processor at the other end, the repeater switch operated to switch selectively between:
   an audio path to the transceiver, the audio path established between the transceiver and the repeater switch to route an audio signal received from the radio microphone to the transceiver via the digital signal processor; and
   a repeat path to the transceiver, the repeat path established between the transceiver and the repeater switch to route demodulated signals corresponding to the receive signals Rx received from accessory antenna to the transceiver via the digital signal processor for simultaneous transmission to other radio devices via the host radio antenna.

11. The portable radio communication system of claim 7, wherein the host radio comprises a belt worn portable public safety two-way radio and the accessory comprises a public safety microphone operatively coupled by a cable to the portable two-way public safety radio.

12. The portable radio communication system of claim 7, wherein the host radio comprises a portable two-way radio having a push-to-talk (PTT) PTT switch and communications during the dual watch mode of operation are not lost when the PTT switch is enabled to respond to either dual watch channels of the dual watch mode of operation.

* * * * *